United States Patent
Jones et al.

(10) Patent No.: US 10,437,130 B2
(45) Date of Patent: Oct. 8, 2019

(54) METHOD AND APPARATUS FOR SIMULATING ELECTROMAGNETIC RADIATION PATH MODIFYING DEVICES

(71) Applicant: BAE SYSTEMS PLC, London (GB)

(72) Inventors: Christopher Charles Rawlinson Jones, Preston (GB); Nicholas Giacomo Robert Colosimo, Preston (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 15/563,820

(22) PCT Filed: Apr. 4, 2016

(86) PCT No.: PCT/GB2016/050948
§ 371 (c)(1),
(2) Date: Oct. 2, 2017

(87) PCT Pub. No.: WO2016/162668
PCT Pub. Date: Oct. 13, 2016

(65) Prior Publication Data
US 2018/0113369 A1    Apr. 26, 2018

(30) Foreign Application Priority Data

Apr. 10, 2015  (EP) .................................... 15275113
Apr. 10, 2015  (GB) .................................... 1506079.1

(51) Int. Cl.
*G02F 1/29*      (2006.01)
*G02F 1/01*      (2006.01)
(Continued)

(52) U.S. Cl.
CPC ............ *G02F 1/293* (2013.01); *G02F 1/0147* (2013.01); *G02F 1/292* (2013.01); *G02B 27/42* (2013.01);
(Continued)

(58) Field of Classification Search
CPC . G02F 1/01; G02F 1/0147; G02F 1/19; G02F 1/29; G02F 1/292; G02F 1/293;
(Continued)

(56) References Cited

U.S. PATENT DOCUMENTS

| | | | |
|---|---|---|---|
| 4,686,605 A | 8/1987 | Eastlund | |
| 4,999,637 A | 3/1991 | Bass | |

(Continued)

FOREIGN PATENT DOCUMENTS

| | | | |
|---|---|---|---|
| DE | 10245682 A1 | 4/2004 | |
| EP | 2002056111 A1 | 7/2002 | |

(Continued)

OTHER PUBLICATIONS

European Search Report of European Application No. EP15275116.0, dated Sep. 17, 2015, 7 pages.

(Continued)

*Primary Examiner* — Loha Ben
(74) *Attorney, Agent, or Firm* — Maine Cernota & Rardin (57) ABSTRACT

A method and apparatus for creating an atmospheric electromagnetic radiation path modifying element (40) operative to simulate a physical optical device, the method comprising applying electromagnetic radiation to a selected plurality of three-dimensional portions (12—FIG. 3) of an atmospheric volume (10) so as to heat and/or ionize the air within said portions, wherein said selected portions are spatially located together in a substantially unbroken three-dimensional configuration.

14 Claims, 9 Drawing Sheets

(51) Int. Cl.
*G02B 27/42* (2006.01)
*G02F 1/19* (2019.01)
(52) U.S. Cl.
CPC ............... *G02F 1/19* (2013.01); *G02F 1/29* (2013.01); *G02F 2001/291* (2013.01); *G02F 2203/24* (2013.01)
(58) Field of Classification Search
CPC ........... G02F 2001/291; G02F 2203/24; F41H 5/007; F41H 11/00; F41H 11/02; F41H 13/00; F41H 13/0043; F41H 13/005; F41H 13/0087; F41H 13/0093; H04N 13/049; G01S 7/495; G01S 7/497; F24S 23/00; F24S 23/30; F24S 23/70; F24S 50/00; F24S 50/40; G02B 1/00; G02B 26/10; G02B 26/101; G02B 27/42; G02B 27/4205; G02B 27/4233; H05H 1/0006; H05H 1/0012; H05H 1/0068; H05H 1/18
USPC ............ 359/288, 298, 299, 558; 219/121.75, 219/121.85, 201, 202, 383, 385, 635; 126/593, 683, 698, 678, 714; 361/231; 244/158.1, 159.4

See application file for complete search history.

(56) References Cited

U.S. PATENT DOCUMENTS

| | | | |
|---|---|---|---|
| 5,041,834 | A | 8/1991 | Koert |
| 5,269,288 | A | 12/1993 | Stirbl et al. |
| 5,415,156 | A | 5/1995 | Stirbl et al. |
| 5,593,549 | A | 1/1997 | Stirbl et al. |
| 5,684,621 | A | 11/1997 | Downing |
| 8,981,261 | B1 | 3/2015 | Tillotson |
| 2004/0135744 | A1 | 7/2004 | Bimber |
| 2009/0009862 | A1 | 1/2009 | Hong |
| 2009/0171477 | A1 | 7/2009 | Nayfeh et al. |
| 2010/0258708 | A1 | 10/2010 | Meyers et al. |
| 2011/0001429 | A1 | 1/2011 | Davis |
| 2011/0121158 | A1 | 5/2011 | Corke et al. |
| 2014/0224776 | A1 | 8/2014 | Elhadj |
| 2014/0327747 | A1 | 11/2014 | Kong |
| 2017/0118545 | A1 | 4/2017 | Kuri |
| 2017/0212602 | A1 | 7/2017 | Hsu |
| 2018/0084244 | A1* | 3/2018 | Colosimo .......... G02B 27/2292 |
| 2018/0088436 | A1* | 3/2018 | Colosimo ............... G02F 1/293 |
| 2018/0095169 | A1* | 4/2018 | Blanchard ................. F41H 3/00 |
| 2018/0128908 | A1* | 5/2018 | Blanchard ................. F41H 11/00 |
| 2018/0143303 | A1* | 5/2018 | Colosimo ............. G01S 7/4817 |

FOREIGN PATENT DOCUMENTS

| | | | |
|---|---|---|---|
| WO | 9428361 | A1 | 12/1994 |
| WO | 2011057342 | A1 | 5/2011 |
| WO | 2011063407 | A2 | 5/2011 |
| WO | 2013039465 | A1 | 3/2013 |

OTHER PUBLICATIONS

Great Britain Search Report of Great Britain Application No. GB1506085.8, dated Oct. 21, 2015, 3 pages.
PCT Search Report for PCT Application No. PCT/GB2016/051003, dated May 24, 2016, 13 pages.
Berreman, D.W., "A Lens or Light Guide Using Convectively Distorted Thermal Gradients in Gases", Bell System Technical Journal, vol. 43, issue 4, pp. 1469-1475, Jul. 1964.
International Search Report and Written Opinion of International Application No. PCT/GB2016/050948, dated Jun. 2, 2016, 12 pages.
European Search Report of European Application No. EP15275113, dated Sep. 18, 2015, 6 pages.
Great Britain Search Report of Great Britain Application No. GB1506079.1, dated Oct. 5, 2015, 3 pages.
"Atmospheric lensing. A Weapon of Selective Destruction" by Steven J. Smith, Nov. 29, 2010. https://web.archive.org/web/20101129164210/http://whale.to/b/atmospheric_lensing.html, accessed on Mar. 10, 2015.
"Can we use atmospheric lenses as telescopes?" online discussion, last comment Oct. 30, 2014, http://www.thenakedscientists.com/forum/index.php?topic=52568.0, accessed on Mar. 10, 2015.
International Search Report and Written Opinion of International Application No. PCT/GB2016/050967, dated Jun. 1, 2016, 13 pages.
Brian W. Neiswander et al: "Plasma Lens for Optical Path Difference Control", AIAA Journal, vol. 50, No. 1, Jan. 1, 2012, pp. 123-130, XP055212822.
Bejot P et al: "32TW atmospheric white-light laser", Applied Physics Letters, American Institute of Physics, vol. 90, No. 15, Apr. 10, 2007, pp. 151106-151106.
Great Britain Search Report of Great Britain Application No. GB1506081.7, dated Oct. 8, 2015, 3 pages.
European Search Report of European Application No. EP15275114, dated Sep. 17, 2015, 8 pages.
International Search Report and Written Opinion of International Application No. PCT/GB2016/050984, dated Jun. 8, 2016, 15 pages.
Anonymous: "Plasma stealth—Wikipedia, the free encyclopedia", Mar. 21, 2015, XP055245259, Retrieved from the internet: https://en.wikipedia.org/wiki/Plasma_stealth.
Bhaskar Chaudhury et al: "Stidy and Optimization of Plasma-Based Radar Cross Section Reduction Using Three-Dimensional Computations", IEEE Transactions on Plasma Science, IEEE Service Center, Piscataway, NJ, US, vol. 37, No. 11, Nov. 1, 2009, pp. 2116-2127.
Great Britain Search Report of Great Britain Application No. GB1506199.7, dated Sep. 30, 2015, 4 pages.
European Search Report of European Application No. EP15275181, dated Jan. 28, 2016, 10 pages.
International Search Report and Written Opinion of International Application No. PCT/GB2016/050980, dated Jun. 10, 2016, 15 pages.
Anonymous: "Deflector Shield—Wookieepedia—Wikia", 1999, XP055244465, Retrieved from the internet: URL:http://starwars.wikia.com/wiki/Deflector_shield/Legends.
Great Britain Search Report of Great Britain Application No. GB1506200.3, dated Sep. 30, 2015, 5 pages.
European Search Report of European Application No. EP15275183, dated Jan. 26, 2016, 10 pages.
International Search Report and Written Opinion of International Application No. PCT/GB2016/050873, dated May 31, 2016, 13 pages.
Baris I. Erkmen: "Computational ghost imaging for remote sensing", Hournal of the Optical Society of America A, vol. 29, No. 5, May 1, 2012, pp. 782-6600, XP055219044.
Baoqing Sun et al: "Normalized ghost imaging", Optics Express, vol. 20, No. 15, Jul. 16, 2012, p. 16892, XP055219055.
Great Britain Search Report of Great Britain Application No. GB1506089, dated Sep. 3, 2015, 3 pages.
European Search Report of European Application No. EP15275119, dated Oct. 12, 2015, 7 pages.
International Preliminary Report on Patentability of International Application No. PCTGB2016050873, dated Oct. 19, 2017, 8 pages.
International Preliminary Report on Patentability of International Application No. PCTGB2016050980, dated Oct. 19, 2017, 6 pages.
International Preliminary Report on Patentability of International Application No. PCTGB2016050984, dated Oct. 19, 2017, 10 pages.
International Preliminary Report on Patentability of International Application No. PCTGB2016051003, dated Oct. 19, 2017, 9 pages.
International Preliminary Report on Patentability of International Application No. PCTGB20160509673, dated Oct. 19, 2017, 8 pages.

* cited by examiner

METHOD AND APPARATUS FOR SIMULATING ELECTROMAGNETIC RADIATION PATH MODIFYING DEVICES

RELATED APPLICATIONS

This application is a national phase application filed under 35 USC § 371 of PCT Application No. PCT/GB2016/050948 with an International filing date of Apr. 4, 2016 which claims priority of GB Patent Application 1506079.1 filed Apr. 10, 2015 and EP Patent Application 15275113.7 filed Apr. 10, 2015. Each of these applications is herein incorporated by reference in its entirety for all purposes.

FIELD OF THE INVENTION

This invention relates generally to a method and apparatus for simulating electromagnetic radiation path modifying devices and, more particularly but not necessarily exclusively, to a method and apparatus for dynamically creating, using one or more laser devices, an electromagnetic radiation path modifying element of a desired size, geometry and/or shape, having desired characteristics, and in a required position/orientation relative to the electromagnetic radiation path to be modified.

BACKGROUND OF THE INVENTION

Figure 1A:
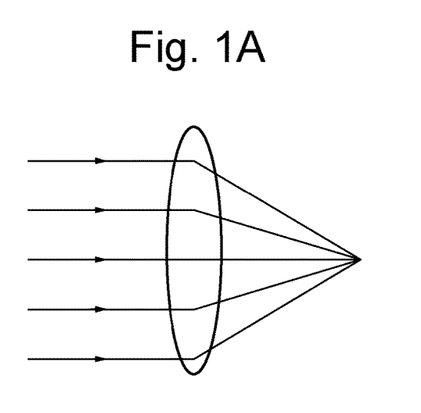
FIG. 1A is a schematic diagram illustrating the principles of a converging lens.
Figure 1B:
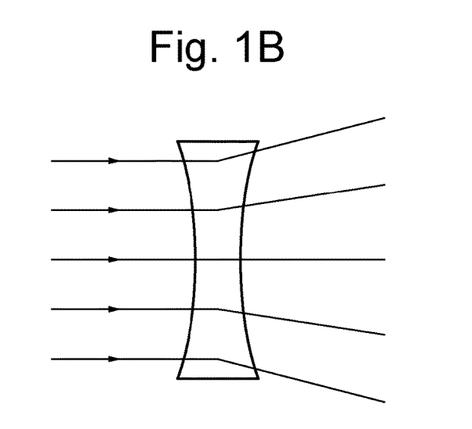
FIG. 1B is a schematic diagram illustrating the principles of a diverging lens.

Electromagnetic (EM) radiation path modifying devices, such as optical devices are well known and widely used for controlling the path of electromagnetic radiation. There are many types of such device in general use. For example, a converging lens is used to collect a wide beam of radiation and 'bend' or converge it toward a point, called a focal point, as illustrated schematically in FIG. 1A. A diverging lens has a negative focal point and causes the parallel rays of an incoming beam of radiation to 'bend' in the opposite direction, thereby causing them to become more spread apart at the output of the device, as illustrated schematically in FIG. 1B. Both the converging and diverging lenses operate on the principle of refraction which is defined as the change in direction of a wave passing from one medium to another caused by its change in speed and the EM radiation path modifying properties of such devices are defined by their geometry, with the refractive index thereof being fixed within a physical device.

SUMMARY OF THE INVENTION

Figures 1C, 1D:
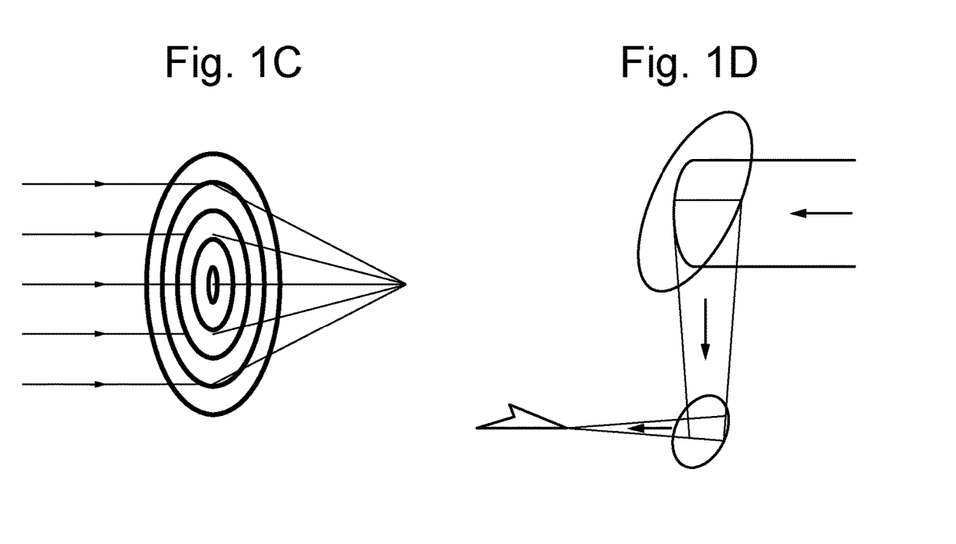
FIG. 1C is a schematic diagram illustrating the principle of a Fresnel zone plate used for focussing radiation.
FIG. 1D is a schematic diagram illustrating the principle of a focussing arrangement using a reflective device and a converging device.

Another well known principle in the field of such devices is known as diffraction, which is defined as the modification which electromagnetic radiation undergoes especially in passing by the edges of opaque bodies or through narrow openings and in which the rays appear to be deflected. For example, and referring to FIG. 1C of the drawings, a (Fresnel) zone plate consists of a set of radially symmetric rings, known as Fresnel zones, which alternate between opaque and transparent. Such a device can be used to focus electromagnetic radiation, whereby radiation hitting the zone plate will diffract around the opaque zones.

Figure 1E:
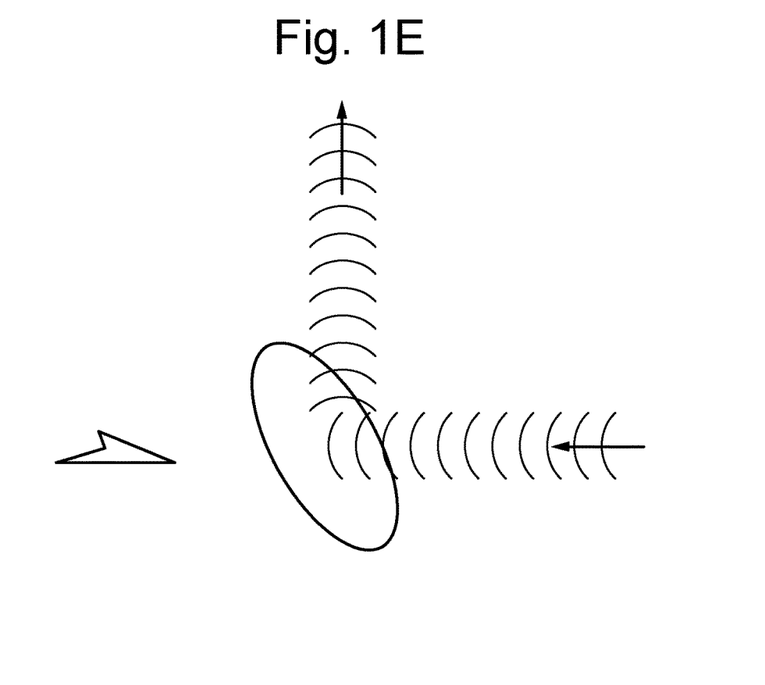
FIG. 1E is a schematic diagram illustrating the principle of a diverting arrangement using a reflective device.

Yet another well known principle in relation to electromagnetic radiation is that of reflection which is defined as the bouncing or throwing back by a surface or body of electromagnetic radiation, without absorbing it. Reflective devices, such as mirrors, are used, for example, in a focussing arrangement, such as that illustrated schematically in FIG. 1D of the drawings, or a diverting arrangement such as that illustrated schematically in FIG. 1E of the drawings.

Whilst there are a large number of electromagnetic radiation path modifying devices available, and their use is widespread, there are a number of limitations associated with this type of technology. A physical device, once manufactured, has a fixed size, and its focal length and aperture is dictated by the physical system within which it is mounted. Thus, its beam modifying properties, characteristics and capabilities are fixed and limited by physical constraints. Furthermore, in some applications, such as airborne applications, limitations may be imposed in terms of the size and weight of equipment that can be carried.

In accordance with the present invention, there is provided a method of creating an atmospheric lens element operative to modify a physical electromagnetic radiation path, the method comprising dividing an atmospheric volume into a matrix of three dimensional portions, applying electromagnetic radiation to a selected plurality of the three-dimensional portions of the atmospheric volume so as to heat and/or ionise air within said portions thereby to define the atmospheric lens element to modify the physical electromagnetic radiation path, wherein said selected portions are spatially located together in a substantially unbroken three-dimensional configuration.

The selected portions may be spatially located together in a substantially unbroken three-dimensional configuration corresponding to the three-dimensional shape of the atmospheric lens element used to modify the physical electromagnetic radiation path. In alternative exemplary embodiments, the selected portions may be configured such that the non-selected portions are in a configuration corresponding to a three-dimensional shape of the atmospheric lens element used to modify the physical electromagnetic radiation path. In yet another exemplary embodiment of the present invention, said selected portions may be spatially located together in a three-dimensional configuration corresponding to an annulus having a non-circular cross-section.

In one exemplary embodiment of the present invention, the method may comprise the step of applying said electromagnetic radiation to said selected portions so as to heat and/or ionise the air therein and thus change the refractive index thereof.

In this case, the atmospheric lens element may be operative to generate a converging lens and said selected portions may be spatially located together in a concave lens configuration. Alternatively, in this case, the non-selected portions may be spatially located together in a convex lens configuration. Thus, the present invention operates on principles that can be thought of as inverse to those used in conventional lenses. In a conventional (e.g. glass) lens, the lens medium is denser and, therefore, has a higher refractive index than the surrounding air. In the case of the present invention, the heated or ionised portions are less dense and, therefore, have a lower refractive index than the surrounding air. In this case, therefore, a converging lens would either have a heated or ionised portion of double concave shape (like the diverging lens of a conventional arrangement) or the air around a double convex region (i.e. the conventional shape of a converging lens) is heated or ionised such that the refractive index of the surrounding air is less than that of the double convex region, thereby ensuring a converging effect when an electromagnetic radiation beam passes into the atmospheric volume thus treated.

Similarly, in another exemplary embodiment, the atmospheric lens element may be operative to simulate a diverging lens and said selected portions may be spatially located together in a convex lens configuration. Alternatively, in this case, the non-selected portions may be spatially located together in a concave lens configuration.

In yet another exemplary embodiment, the atmospheric lens element may be operative to generate a diffractive device to diffractively modify the physical electromagnetic radiation path. For example, said three-dimensional shapes, spatially separated, may define a plurality of concentric transmissive and adjacent substantially opaque regions in the form of a zone plate.

In other exemplary embodiments of the invention, the atmospheric lens element may be operative to generate a reflective device and the method may comprise the steps of applying said electromagnetic radiation to said selected portions so as to heat and/or ionise the air therein to reflectively modify the physical electromagnetic radiation path.

In this case, the method may further comprise the step of propelling a quantity of particulate solid material into said atmospheric volume before applying said electromagnetic radiation to said selected portions thereof. A purpose of this additional step is to 'pre-seed' the atmospheric volume with a material that is more readily ionisable than air, and suitable materials, such as metal powders and particulate plastics, will be apparent to a person skilled in the art.

The atmospheric volume may be divided into an array of three dimensional portions, and the method comprises the step of sequentially applying said electromagnetic radiation to said selected portions within said array.

In all of the above-mentioned cases, the electromagnetic radiation may be a laser.

In accordance with another aspect of the present invention, there is provided apparatus for creating an atmospheric lens element for modifying a physical electromagnetic radiation path, the apparatus comprising an electromagnetic radiation source communicably coupled to a control system, said control system comprising a database on which is stored data representative of a three-dimensional matrix configuration of individual three-dimensional elements corresponding to the atmospheric lens element, and a processor for mapping said stored three-dimensional matrix configuration of elements to an atmospheric volume, the processor being further configured to generate actuation signals configured to cause said electromagnetic radiation source to apply electromagnetic radiation to a selected plurality of portions of said atmospheric volume so as to heat and/or ionise the air therein and thereby define the atmospheric lens element to modify the physical electromagnetic radiation path, said selected portions or the remaining non-selected portions of atmospheric volume being spatially located together in substantially the same configuration as said stored three-dimensional matrix configuration of elements.

The electromagnetic radiation source may include a beam steering mechanism for selectively steering a beam of electromagnetic radiation output therefrom, said control system being communicably coupled to said beam steering mechanism and configured to generate signals for steering said beam of electromagnetic radiation relative to said atmospheric volume so as to sequentially apply electromagnetic radiation to said selected portions of atmospheric volume.

The apparatus may comprise a beam splitting module for splitting a beam output from said electromagnetic radiation source into a plurality of paths corresponding to respective locations of selected portions of atmospheric volume.

The apparatus may further comprise an atmospheric lens element monitoring module for monitoring atmospheric conditions along the path between the electromagnetic radiation source and the atmospheric lens element (both in the element itself and the atmospheric volume surrounding the element), generating data representative thereof, and transmitting said data to said processor, said processor being further configured to generate adjusted actuation signals configured to adjust at least one characteristic of said electromagnetic radiation so as to compensate for atmospheric distortion. The apparatus may further comprise a quality monitoring module for monitoring the performance (i.e. the properties and characteristics) of the atmospheric lens element against a predefined set of desired criteria, and generating signals to dynamically adjust beam steering and/or power of the electromagnetic radiation source so as to reduce or eliminate deviation of the properties and characteristics of the atmospheric lens element from that which is defined by the predefined criteria. Such deviation may be caused by atmospheric distortion or otherwise. In other words, successive and/or continuous 'fine tuning' of the atmospheric lens element is facilitated to create and maintain an atmospheric lens element having consistently desired characteristics and quality.

Aspects of the present invention may also extend to a control system for apparatus such as that described above and configured to be communicably coupled to an electromagnetic radiation source, said control system comprising a database on which is stored data representative of a three-dimensional matrix configuration of individual three-dimensional elements corresponding to the atmospheric lens element, and a processor for mapping said stored three-dimensional configuration of elements to an atmospheric volume, the processor being further configured to generate actuation signals configured to cause said electromagnetic radiation source to apply electromagnetic radiation to a selected plurality of portions of said atmospheric volume so as to heat and/or ionise the air therein and thereby define the atmospheric lens element to modify the physical electromagnetic radiation path, said selected portions being spatially located together in substantially the same configuration as said stored three-dimensional matrix configuration of elements.

BRIEF DESCRIPTION OF THE DRAWINGS

These and other aspects of the present invention will be apparent from the following specific description in which embodiments of the present invention are described in detail, by way of examples only, and with reference to the accompanying drawings, in which.

DETAILED DESCRIPTION

Thus, aspects of the present invention operate on the principle of using one or more laser devices to selectively alter the refractive index and/or cause ionisation of portions of a three dimensional region of the atmosphere remote from the laser device(s) so as to create or simulate an optical component of a desired size and having selected optical properties.

Figure 2:
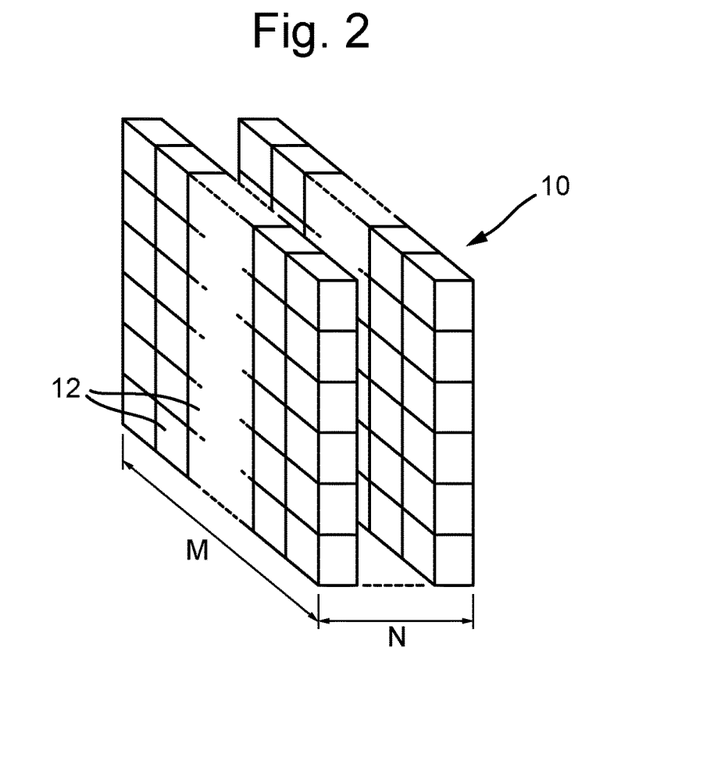
FIG. 2 is a schematic diagram illustrating the concept of an M by N cell matrix for the purposes of defining an atmospheric volume within which an atmospheric EM radiation path modifying component may be created in accordance with an exemplary embodiment of the present invention.

In general, and referring to FIG. 2 of the drawings, the area of the atmosphere in which an EM radiation path modifying component is required to be created can be considered as a cell matrix 10 comprised of M rows and N columns or layers of 'cells' 12, wherein a cell is simply a predefined three-dimensional portion of the matrix. In the example shown, each cell is identical in size and shape, but this is not essential, and the present invention is not necessarily intended to be limited in this regard. It will also be appreciated that the number of cells in the vertical dimension of the cell matrix may vary. Thus, the cell matrix may be of any desired size, shape and number of cells.

Within the matrix 10, the three dimensional structure of an EM radiation path modifying device can be defined in terms of a number of cells 12 in a desired configuration, and it is these cells that will then be targeted by the laser source in order to effect the desired change in their respective properties (either by ionisation or heating to cause a change in refractive index).

It is known that an increase in temperature of a volume of air causes a corresponding decrease in density of that volume of air. As a result, the refractive index of warm air is lower than that of cooler (and therefore denser) air. Thus, some aspects of the present invention operate on the principle that by providing a volume of air that is warmer than the air around it, that volume of air can cause refraction of a beam of electromagnetic radiation as it passes through, in a manner similar to a convergent or divergent lens.

It is also known that if an electric field of a sufficiently high power is applied to a volume of air, the air may be ionised. Ionised air has reflective properties over a range of electromagnetic radiation wavelengths, such properties being a function of density and the type of ionisation created. Thus, some aspects of the present invention operate on the principle that by ionising a volume of air can cause it to reflect a beam of electromagnetic radiation as it hits that volume, in a manner similar to a mirror or similarly reflective device. A mixture of the two principles can be used to create a diffractive element, as will be described in more detail later.

Thus, referring back to FIG. 2 of the drawings, it will be appreciated that by selectively heating or ionising cells 12 within the matrix 10 a three dimensional atmospheric EM radiation path modifying component can be created using a high power electromagnetic radiation source. This may be achieved in a number of different ways. For example, a pulsed power laser (PPL) may be employed, and the 'Kerr' effect exploited therewith in order to attain self focussing of the laser beam at a required point (i.e. within the selected cell). Alternatively, a combination (i.e. crossing over) of two continuous wave (CW) laser beams at a required point may be used to achieve the desired effect. In any event, the laser system(s) is/are configured to selectively heat or ionise the atmosphere, thus changing its refractive index and electromagnetic properties such that electromagnetic energy passing through the heated cells is refracted and/or electromagnetic energy hitting the ionised cells is reflected.

Figure 3:
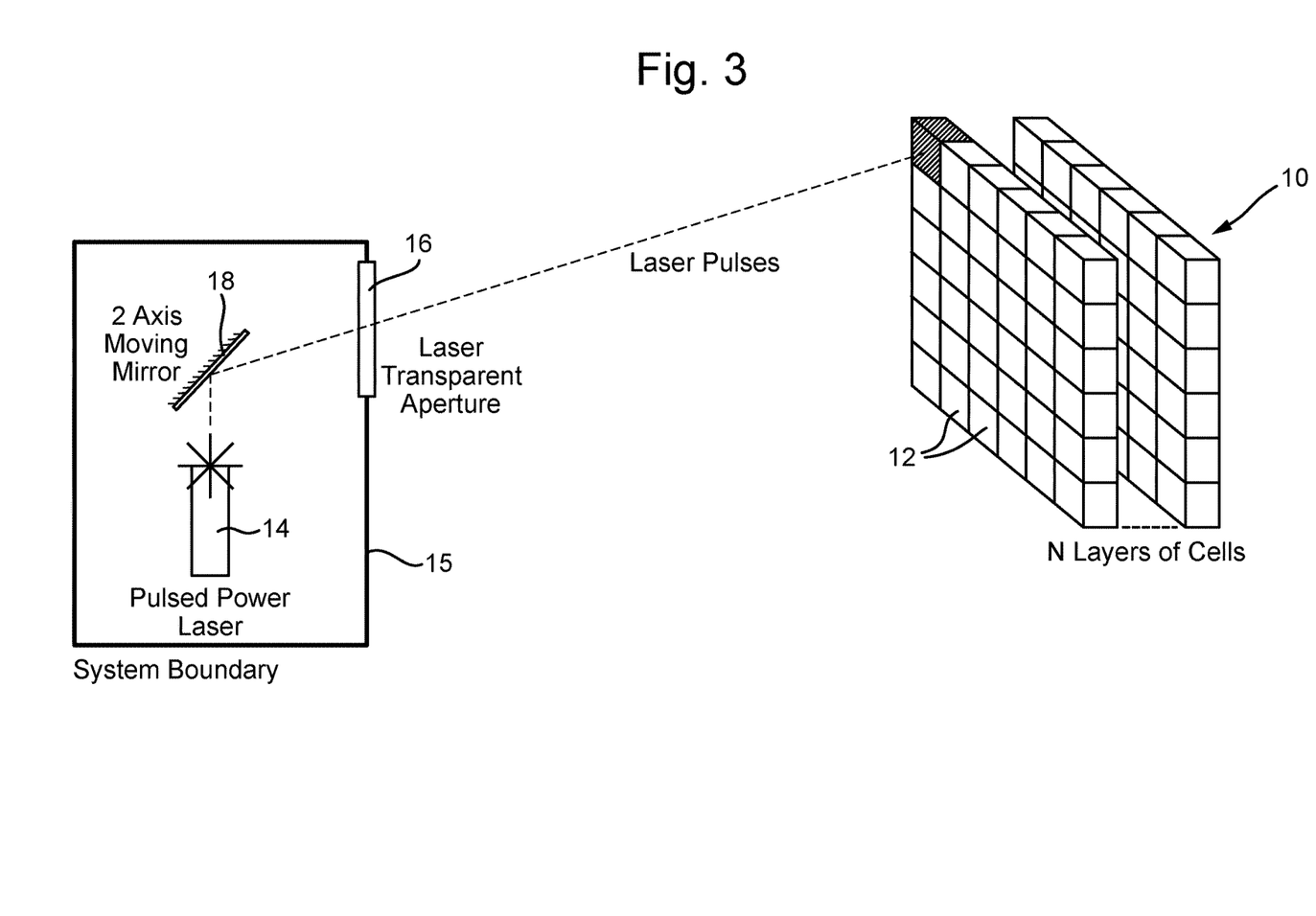
FIG. 3 is a schematic diagram illustrating the manner in which laser power may be applied to selected cells within a matrix in accordance with a first exemplary embodiment of the present invention.

Thus, referring to FIG. 3 of the drawings, apparatus according to one exemplary embodiment of the present invention comprises at least one laser source 14 mounted in an enclosure 15. In the example shown, the laser source 14 is a pulsed power laser source configured to emit high power laser pulses toward the cell matrix 10 via a laser transparent aperture 16. An optically reflective device, i.e. mirror, 18 is mounted on a dual-axis actuator (not shown) in the main laser output path, the actuator being communicably coupled with a control system that is configured to cause the actuator (and, therefore, the mirror 18) to move thereby to selectively direct the laser output through the aperture 16 toward selected cells 12 of the matrix 10. The control system may, for example, be configured to cause the laser output to be scanned across the cell matrix providing a pulse (or more than one pulse) to each selected cell, either via a raster pattern or a pattern optimised to suit the type of atmospheric component required to be created and its operational requirements.

As mentioned briefly above, the laser pulse is self-focussing by means of the 'Kerr' effect, thereby enabling it to deliver enough concentrated power to heat or ionise the cell at which it is directed. The Kerr effect is a change in the refractive index of a material in response to an applied electric field. In the case of a laser pulse of sufficiently high power, its electric field is sufficiently high to change the refractive index of the air. As a result, the cross-sectional area of the pulse (perpendicular to the direction of propagation) can be thought of as shrinking with distance (due to the differences in refractive index), thus bringing the pulse to an intense focus at some point down range of the laser, in this case at the selected cell. This intense focus is of sufficiently high intensity to heat or ionise the cell to change its refractive index and/or other EM radiation path modifying properties. One or more pulses may be provided per cell, dependent upon the desired effect and environmental conditions. It may also be necessary to periodically re-supply laser pulses to all selected cells to maintain the required change in refractive index and/or ionisation for as long as the atmospheric component is required, as once the laser power is removed from a cell, the air therein will very quickly return to its normal (unheated or non-ionised) state.

Figure 4:
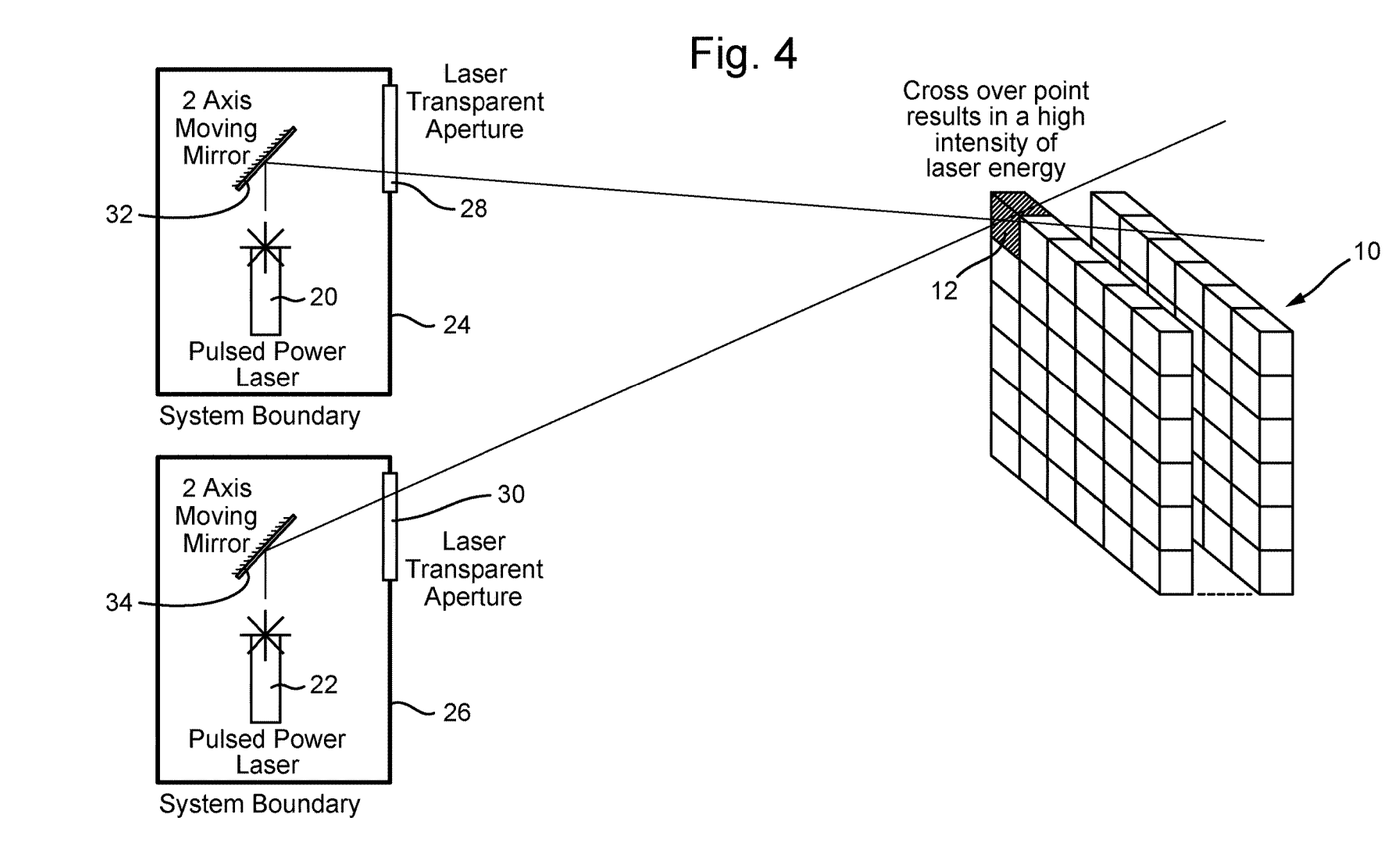
FIG. 4 is a schematic diagram illustrating an alternative manner in which laser power may be applied to selected cells within a matrix in accordance with another exemplary embodiment of the present invention.

Referring to FIG. 4 of the drawings, in an alternative exemplary embodiment of the invention, two (or more) CW (continuous wave) laser sources 20, 22 may be provided in respective enclosures 24, 26, each having a laser transparent aperture 28, 30 therein. Once again, each laser system is provided with a mirror 32, 34 mounted on a dual-axis actuator (not shown) communicably coupled to a control system (not shown). Operation of the system is similar, in principle, to that described previously with reference to FIG. 3 of the drawings except, in this case, two (or more) spatially separated CW lasers (which may be mounted on the same platform or across different platforms) are used to selectively heat/ionise the atmosphere in each required cell. This is achieved by ensuring (through pointing) that the laser beams cross over at the same point (in the selected cell 12), thereby ensuring that sufficient power is attained. Such scanning may be performed on the basis of a control system configured to maintain a predetermined spatial separation and orientation between the atmospheric component and the electromagnetic radiation source. However, in an alternative exemplary embodiment, such scanning may be performed using a control system configured to direct the source(s) at specific coordinates corresponding to specific respective locations within the atmosphere.

In yet another exemplary embodiment, and either in addition to the above-mentioned arrangements or alternatively, it is envisaged that a beam splitter could be employed to split a laser beam into numerous new paths corresponding to the configuration of a plurality of respective cells to be targeted. Thus, a plurality of such cells could be targeted simultaneously, without the need for scanning a single laser path across the cell matrix.

In the following, a number of exemplary atmospheric electromagnetic radiation path modifying components that can be created according to respective exemplary embodiments of the present invention will now be described. However, it will be appreciated by a person skilled in the art that the principles set forth herein can be applied in numerous different ways in order to create other types and configurations of electromagnetic (EM) radiation path modifying components and the present invention is not necessarily intended to be limited in this regard.

Figure 5A:
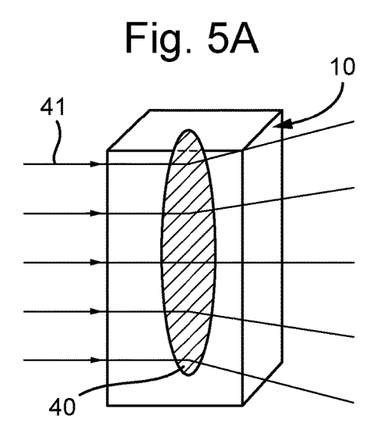
FIG. 5A is a schematic diagram illustrating an atmospheric diverging lens created in accordance with an exemplary embodiment of the present invention.
Figure 5B:
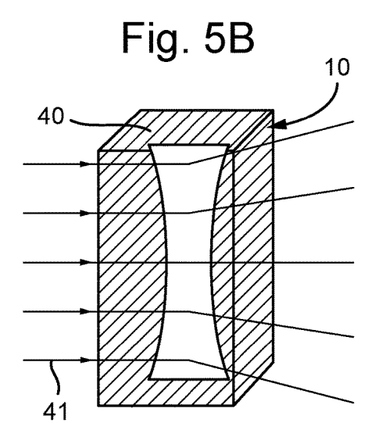
FIG. 5B is a schematic diagram illustrating an alternative atmospheric diverging lens created in accordance with an exemplary embodiment of the present invention.

Referring to FIG. 5A of the drawings, in one of its simplest forms, an exemplary embodiment of the present invention may be employed to create an atmospheric diverging lens. The illustrated lens 40 is of a double convex lens configuration and, in the example shown, has been created generally centrally within the cell matrix 10 with its longitudinal axis in line with the generally central vertical axis of the matrix 10. In order to create the lens 40, the cells corresponding to the three-dimensional 'structure' of a double convex lens are heated, for example using one of the methods described above, thereby to reduce the refractive index of those cells relative to the surrounding cells, and cause the rays of an incoming beam 41 of electromagnetic radiation to be refracted as they enter the component 40 and diverge. For the avoidance of doubt, it will be appreciated that the atmospheric component 40 is a three-dimensional area within the cell matrix comprised of a plurality of atmospheric cells, each of which has been heated in order to attain the required refractive index. A control system and any number of lasers may be employed to ensure that the correct amount of laser power is applied to each cell in order to attain the required level of heating, having regard to environmental factors and the refractive index change required to be achieved. When the component is no longer required, the laser power can simply be removed, and the atmospheric cells will quickly return to their normal state. In an alternative exemplary embodiment, a diverging lens may be created in accordance with an exemplary embodiment of the invention, by heating the cells surrounding a three-dimensional configuration of cells in the shape of a double concave lens (similar in form to that of a conventional diverging lens). Thus, the resultant atmospheric element would comprise a concave lens-shaped region of unheated cells surrounded by a body of heated cells, as shown in FIG. 5B (wherein the shaded area 40 denotes the heated cells and the double concave lens region is unheated).

Figure 6A:
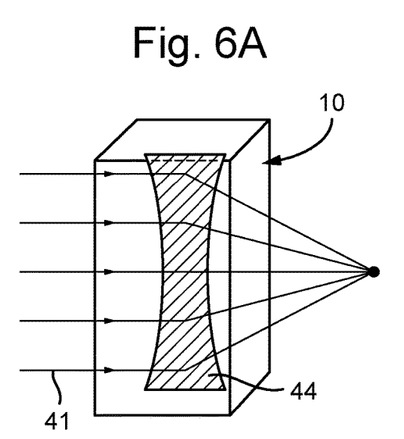
FIG. 6A is a schematic diagram illustrating an atmospheric converging lens created in accordance with an exemplary embodiment of the present invention.
Figure 6B:
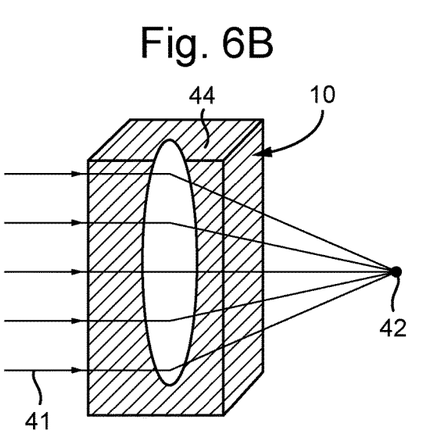
FIG. 6B is a schematic diagram illustrating an alternative atmospheric converging lens created in accordance with an exemplary embodiment of the present invention.

Referring to FIG. 6A of the drawings, an exemplary embodiment of the present invention may be used to create an atmospheric converging lens 44. Thus, in this particular case, the three-dimensional 'structure' represented by the heated cells within the matrix 10 comprises a double concave lens structure, wherein the rays of the incoming beam 41 of electromagnetic radiation are 'bent' or refracted as they enter the atmospheric component 44 and converge to a focal point 42. In an alternative exemplary embodiment, a converging lens may be created by heating the cells surrounding a three-dimensional configuration of cells in the shape of a convex lens (similar in form to that of a conventional converging lens). Thus, the resultant atmospheric element would comprise a convex lens-shaped region of unheated cells surrounded by a body of heated cells, as shown in FIG. 6B of the drawings (wherein the shaded area 44 denotes the heated cells and the double convex lens region is unheated). In yet another exemplary embodiment, the body of heated cells may form an annulus having, for example, a double convex cross-section.

In both cases described above with reference to FIGS. 5A and B and 6A and B of the drawings, the refractive index of the heated cells forming the lens structure is substantially constant, and the differing EM radiation path modifying properties (i.e. converging vs. diverging) are achieved by the geometry of the component. In other words, as with a physical component, it is just the geometry of the three dimensional volume of heated cells (or unheated cells) that defines the function of the resultant lens.

Figure 7:
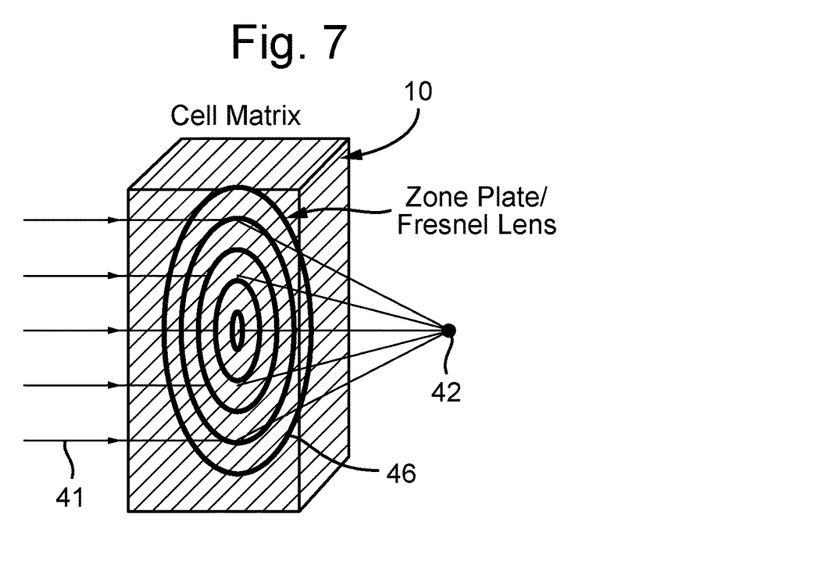
FIG. 7 is a schematic diagram illustrating an atmospheric Fresnel zone plate created in accordance with an exemplary embodiment of the present invention.

Referring now to FIG. 7 of the drawings, in yet another exemplary embodiment of the present invention, diffractive and refractive properties may be combined in order to create more complex atmospheric EM radiation path modifying components. In the illustrated example, a Fresnel zone plate 46 is defined substantially diagonally across the cell matrix 10. The zone plate 46 is formed of concentric rings of heated cells, diametrically separated by unheated cell regions; or it may be formed of concentric rings of ionised (reflective) cells diametrically separated by heated (or unheated) cells (transmissive). The resultant component combines refraction with the diffractive effects from boundaries between regions of significantly different refractive index and/or electromagnetic properties. Thus, it can be seen that more complex EM radiation path modifying components can be created by varying both the geometry and the refractive indices within the atmospheric 'structure'.

As explained above, it is also possible to simulate reflective components and arrangements in accordance with other exemplary embodiments of the present invention. Thus, referring to FIGS. 8 and 8A of the drawings, a focussing arrangement is illustrated which is comprised of two reflective atmospheric components 50, 52. In this case, two spatially separated cell matrices 10a, 10b are defined, both of which are three-dimensional concave elements (relative to the incoming beam of electromagnetic radiation 54).

Figure 8:
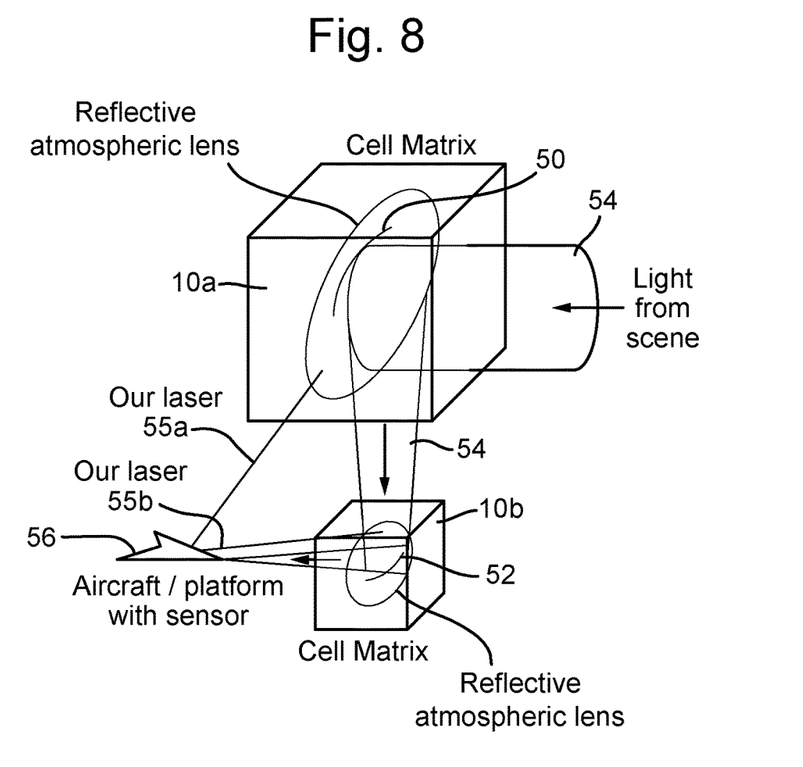
FIG. 8 is a schematic diagram of a focussing arrangement employing atmospheric reflective components created in accordance with an exemplary embodiment of the present invention.
Figure 8A:
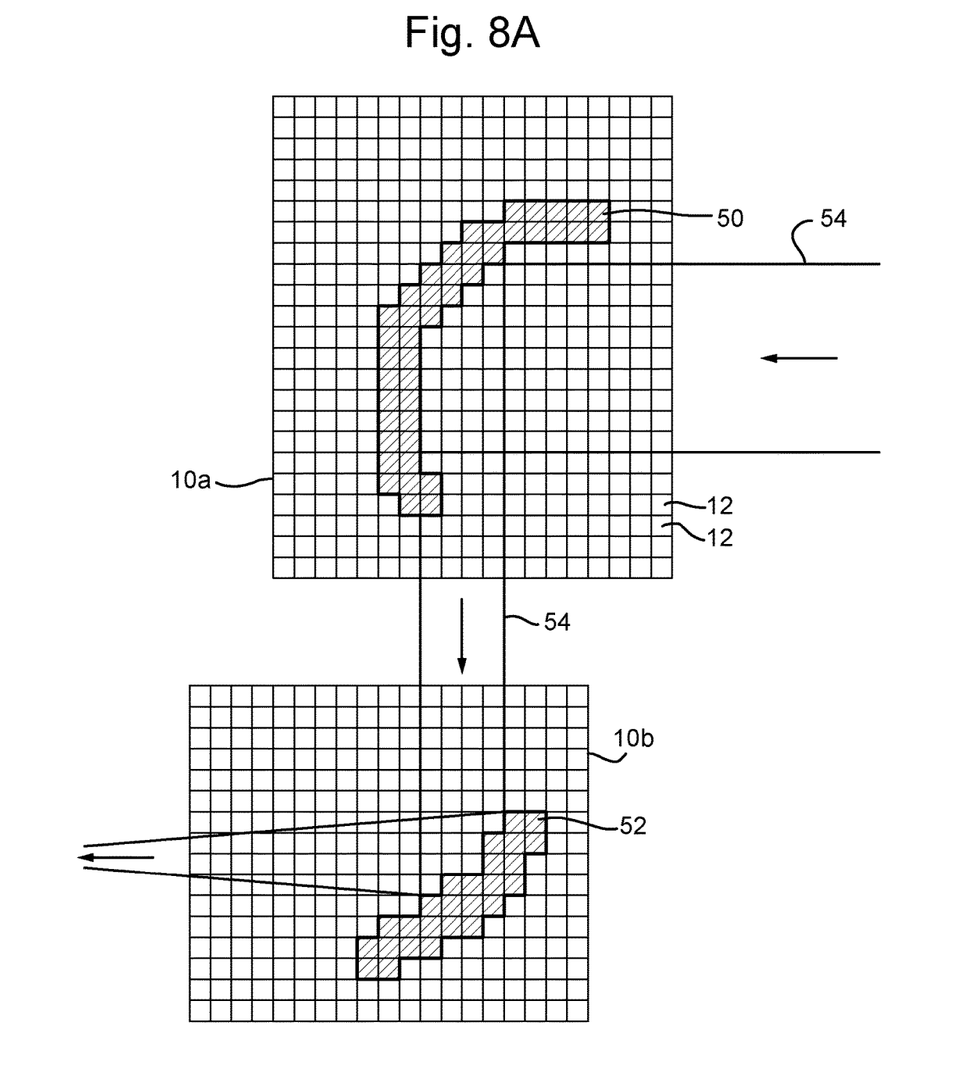
FIG. 8A is a schematic side view of the focussing arrangement of FIG. 8.

The atmospheric reflective components 50, 52 are formed by ionisation of selected cells (in a configuration matching the required 'structure' and orientation of the respective components within the cell matrices 10a, 10b). In the example illustrated, the ionisation of the cells for both components may be effected by means of laser sources 55a, 55b mounted in or on the same platform, such as an aircraft 56 or the like. In use, an incoming beam 54 of electromagnetic radiation, such as light from a scene, for example, hits the first reflective component 50 and is reflected and converged toward the second reflective component 52. The beam 54 is then reflected and converged by the second reflective component 52 toward a receiver on the platform 56, as shown.

In the examples illustrated, the cell matrices 10a, 10b are 'upright' and the orientation of the atmospheric elements is achieved by the pattern of the ionised/heated cells. However, it will be appreciated that, in alternative exemplary embodiments of the invention, the cell matrix itself may be oriented to match the required orientation of the atmospheric EM radiation path modifying element and, in this case, the populated cell pattern (relative to the cell matrix) will always be the same for a particular atmospheric element of a specified size. Also, it will be appreciated that a more 'curved' profile of the atmospheric components thus created may be achieved by varying the degree of heating/ionisation in the peripheral populated cells.

Figure 9:
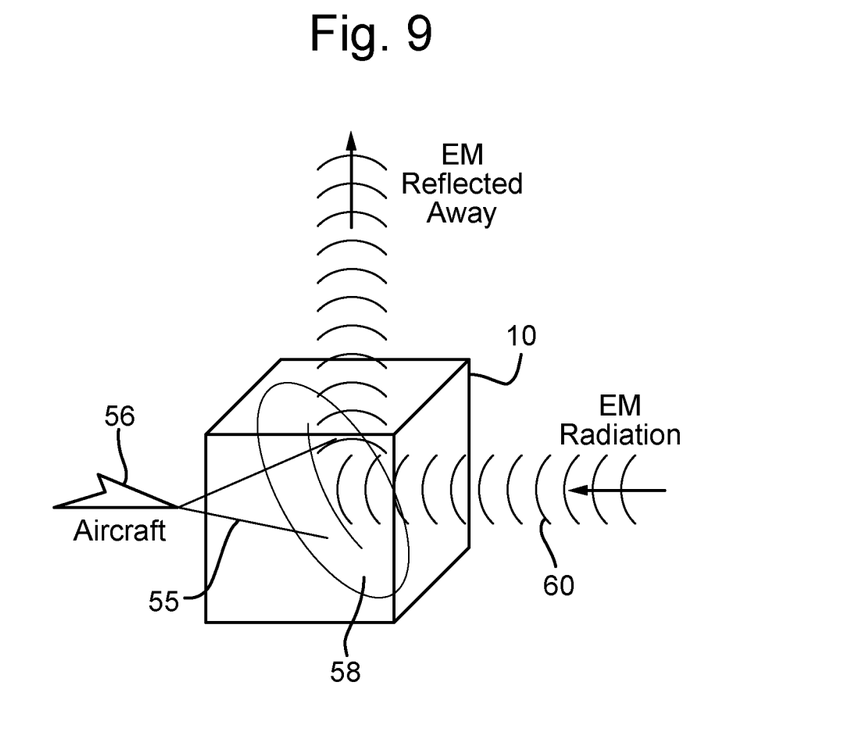
FIG. 9 is a schematic diagram of a diverting arrangement employing an atmospheric reflective component created in accordance with an exemplary embodiment of the present invention.

In yet another exemplary embodiment, and referring to FIG. 9 of the drawings, a diverting arrangement may be dynamically configured by an airborne platform 56 to divert electromagnetic radiation (such as unwanted communication signals) therefrom. Thus, in this case, the on-board laser source(s) 55 may be used to ionise selected cells within a defined cell matrix 10 so as to create a three dimensional, reflective area therein which is oriented substantially diagonally across and through the matrix 10 and concave in the direction of the incoming electromagnetic radiation 60. The radiation 60 hits the atmospheric reflective component 58 thus created and is reflected through substantially 90°, away from the platform 56, as illustrated.

Figure 10:
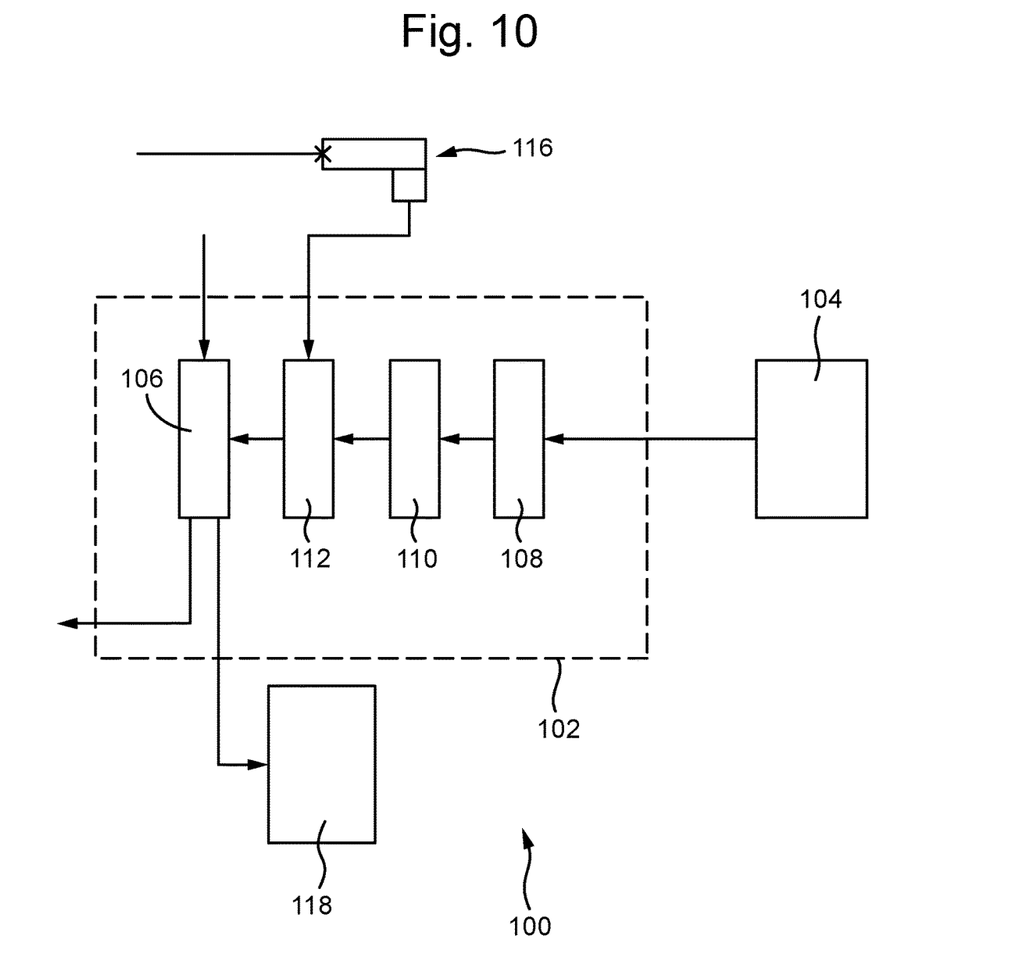
FIG. 10 is a schematic block diagram illustrating apparatus for creating an atmospheric lens element EM radiation path modifying component according to an exemplary embodiment of the present invention.

Referring to FIG. 10 of the drawings, an apparatus in accordance with an exemplary embodiment of the present invention for creating an atmospheric EM radiation path modifying component comprises a control module 100 communicably coupled to, for example, a dual-axis actuator on which a reflective component is mounted within a laser system such as that described above with reference to FIGS. 3 and 4 of the drawings. Such a laser system may, for example, be mounted in or on an airborne platform such as a manned aircraft or UAV.

The control module 100 comprises a processor 102 communicably coupled to a database 104. The database has stored therein data representative of one or more cell matrices, representative of respective atmospheric volumes, and the cells therein that need to be 'populated' (i.e. heated or ionised) in order to construct a respective three-dimensional atmospheric EM radiation path modifying element. Such data may also include information as to the degree of ionisation/heating required to be maintained in order to achieve the required EM radiation path modifying characteristics of the element. It will be appreciated that the database may simply include a single 'template' or populated cell matrix, bespoke to the platform or application in which the respective atmospheric element is to be used. However, in alternative exemplary embodiments, the database may include a plurality of different such templates from which a required atmospheric component can be selected for use, as required.

The processor 102 includes an input and an interface 106 for receiving an actuation signal indicative that an atmospheric component is required to be created, together with data representative of the size and orientation of the required component, and data representative of the position and orientation of the atmospheric component relative to the platform on which the apparatus is mounted, the electromagnetic radiation path to be modified and/or the laser source used to create the atmospheric component. The actuation signal and accompanying data may be manually entered by an operative, but may equally be automatically generated in response to detection of an electromagnetic signal required to be received on the platform or deflected/diverted therefrom.

The processor 102, in response to the actuation signal, searches the database 104 for the populated cell matrix data corresponding to the atmospheric component required to be created, and retrieves the associated data. A transformation module 108 is provided, which transforms the matrix cell data onto data representative of the real atmospheric matrix cell within which the EM radiation path modifying component is to be created, both in terms of size and orientation thereof, and determines precise coordinates for the location of each real atmospheric cell relative to the corresponding respective cell of the stored matrix (and also relative to the platform on which the apparatus is mounted, the electromagnetic source to be modified and/or the laser source used to create the atmospheric component), and a mapping module 110 maps the respective population data from the stored cell matrix onto the data representative of the real atmospheric cell matrix accordingly. Thus, the processor now knows the precise physical location of each cell in the real atmospheric cell matrix and the cell 'population' pattern required to create the atmospheric component. Finally, such data is converted, by a signal processing module 112, into a scanning pattern comprised of a pattern of actuation signals configured to move and actuate the laser beam(s) in order to selectively heat/ionise the real atmospheric cell matrix in the required pattern (and to the required degree) to create the three-dimensional atmospheric element. In other words, the actuation signals are configured to control the power and beam steering of the laser source(s) to heat/ionise each selected cell as required.

Furthermore, an atmospheric component monitoring system 116 may be provided within, or communicably coupled to, the control module 100. The atmospheric component monitoring system 116 may, for example, comprise a low power laser of a suitable wavelength (as will be apparent to a person skilled in the art) to detect atmospheric effects. Thus, the monitoring system 116 may form part of a feedback loop with the signal processing module 112 to enable the actuation signals to be adjusted to compensate for atmospheric distortion. In alternative exemplary embodiments, the apparatus may comprise a quality monitoring module for monitoring the performance (i.e. the properties and characteristics) of the atmospheric element against a predefined set of desired criteria, and generating signals to dynamically adjust beam steering and/or power of the electromagnetic radiation source so as to reduce or eliminate deviation of the properties and characteristics of the atmospheric element from that which is defined by the predefined criteria. Such deviation may be caused by atmospheric distortion or otherwise. In other words, successive and/or continuous 'fine tuning' of the atmospheric element is facilitated to create and maintain an atmospheric element having consistently desired characteristics and quality.

In one exemplary embodiment of the present invention, the apparatus may further comprise a pre-seeding module 118. The pre-seeding module 118 may comprise a tank or receptacle containing particulate material, such as metal powder or plastic particles, which tend to be more readily ionised by laser power than air. Suitable materials for this purpose will be apparent to a person skilled in the art. The pre-seeding module 118 will also include a propelling mechanism for propelling the particulate material into a defined atmospheric cell matrix, the propelling mechanism being communicably coupled to the signal processing module 112. In use, if a reflective atmospheric component is required to be created, the initial actuation signal may be configured to operate the propelling mechanism and cause a quantity of the particulate material to be sprayed into the defined atmospheric volume corresponding to the cell matrix, before selective ionisation of the individual cells. As the particulate material is more readily ionised than air, it may be possible to create the required reflective atmospheric component using a lower power laser than would otherwise be required.

It will be appreciated by a person skilled in the art from the foregoing description that modifications and variations can be made to the described embodiments without departing from the scope of the invention as defined by the appended claims. Indeed, it will be appreciated that numerous variations are possible in terms of the shape and configuration of the three dimensional heated/ionised cell combinations in order to define any desired atmospheric EM radiation path modifying component. Furthermore, combinations of heating and ionisations can be used within a single cell matrix in order to realise more complex component configurations.

The invention claimed is:

1. A method of creating an atmospheric lens element operative to modify a physical electromagnetic radiation path, the method comprising:
dividing an atmospheric volume into a matrix of three dimensional portions, applying electromagnetic radiation to a selected plurality of the three-dimensional portions of the atmospheric volume so as to heat and/or ionise air within said selected portions thereby to define the atmospheric lens element to modify the physical electromagnetic radiation path, wherein said selected portions are spatially located together in a substantially unbroken three-dimensional configuration.

2. The method according to claim 1, wherein said selected portions are spatially located together in a substantially unbroken three-dimensional configuration corresponding to a three-dimensional shape of the atmospheric lens element used to modify the physical electromagnetic radiation path.

3. The method according to claim 1, wherein said selected portions are configured such that non-selected portions are in a configuration corresponding to a three-dimensional shape of the atmospheric lens element used to modify the physical electromagnetic radiation path.

4. The method according to claim 1, wherein further comprising applying said electromagnetic radiation to said selected portions so as to heat and/or ionise the air therein to change the refractive index thereof.

5. The method according to claim 1, wherein the atmospheric lens element is operative to generate a diffractive device to diffractively modify the physical electromagnetic radiation path.

6. The method according to claim 1, wherein the atmospheric lens element is operative to generate a reflective device, and wherein the method further comprises applying said electromagnetic radiation to said selected portions so as to heat and/or ionise the air therein as to reflectively modify the physical electromagnetic radiation path.

7. The method according to claim 1, further comprising propelling a quantity of particulate solid material into said atmospheric volume before applying said electromagnetic radiation to said selected portions thereof.

8. The method according to claim 1, wherein said atmospheric volume is divided into an array of three dimensional portions, and wherein the method further comprises sequentially applying said electromagnetic radiation to said selected portions within said array.

9. The method according to claim 1, wherein the electromagnetic radiation is generated by a laser.

10. Apparatus for creating an atmospheric lens element for modifying a physical electromagnetic radiation path, the apparatus comprising an electromagnetic radiation source communicably coupled to a control system, said control system comprising a database on which is stored data representative of a three-dimensional matrix configuration of individual three-dimensional elements corresponding to the atmospheric lens element, and a processor for mapping said stored three-dimensional matrix configuration of elements portions to an atmospheric volume, the processor being further configured to generate actuation signals configured to cause said electromagnetic radiation source to apply electromagnetic radiation to a selected plurality of portions of said atmospheric volume so as to heat and/or ionise air within said selected portions and thereby define the atmospheric lens element to modify the physical electromagnetic radiation path, said selected portions or remaining non-selected portions of said atmospheric volume being spatially located together in substantially the same configuration as said stored three-dimensional matrix configuration of elements.

11. The apparatus according to claim 10, wherein said electromagnetic radiation source includes a beam steering mechanism for selectively steering a beam of electromagnetic radiation output therefrom, said control system being communicably coupled to said beam steering mechanism and configured to generate signals for steering said beam of electromagnetic radiation relative to said atmospheric volume so as to sequentially apply electromagnetic radiation to said selected portions of said atmospheric volume.

12. The apparatus according to claim 10, comprising a beam splitting module for splitting a beam output from said electromagnetic radiation source into a plurality of paths corresponding to respective locations of selected portions of said atmospheric volume.

13. The apparatus according to claim 10, further comprising an atmospheric lens element monitoring module for monitoring atmospheric conditions, generating data representative thereof, and transmitting said data to said processor, said processor being further configured to generate adjusted actuation signals configured to adjust at least one characteristic of said electromagnetic radiation so as to compensate for atmospheric distortion.

14. The apparatus according to claim 10, further comprising a quality monitoring module for monitoring the performance of the atmospheric lens element against a predefined set of desired criteria, and generating signals to dynamically adjust beam steering and/or power of the electromagnetic radiation source so as to reduce or eliminate deviation of the properties and characteristics of the atmospheric lens element from that which is defined by the predefined criteria.

* * * * *